United States Patent [19]

Casey

[11] Patent Number: 5,416,527
[45] Date of Patent: May 16, 1995

[54] FREQUENCY LOCKING SYSTEM USING SOUND INTERMEDIATE FREQUENCY (IF) CARRIER IN A TELEVISION SIGNAL

[75] Inventor: Robert F. Casey, Santa Clara, Calif.

[73] Assignee: Zoran Corporation, Santa Clara, Calif.

[21] Appl. No.: 168,625

[22] Filed: Dec. 15, 1993

[51] Int. Cl.⁶ .............................................. H04N 5/04
[52] U.S. Cl. .................................... 348/537; 348/536; 348/738
[58] Field of Search ............... 358/198, 143, 148, 158, 358/195.1, 188, 17; 348/536, 537, 539, 735, 738; H04N 5/04, 5/12, 5/455, 5/60

[56] References Cited

U.S. PATENT DOCUMENTS 4,514,763 4/1985 Rindal .................................. 348/738
4,953,021 8/1990 Ishikawa et al. ...................... 348/738

FOREIGN PATENT DOCUMENTS 2645567 4/1977 Germany ........................... 358/195.1
0172068 10/1983 Japan .................................... 358/188

Primary Examiner—James J. Groody
Assistant Examiner—David E. Harvey
Attorney, Agent, or Firm—Townsend and Townsend Khourie and Crew

[57] ABSTRACT

A frequency controlled clock circuit for use in a television receiver utilizes a detected sound intermediate frequency (IF) signal for use in controlling a voltage controlled oscillator and thereby provide immunity from ghost signals in the transmitted video signal. A phase locked loop responds to phase errors detected from the voltage controlled oscillator and a reference signal from the sound IF signal to control the frequency of the voltage controlled oscillator.

5 Claims, 2 Drawing Sheets

FREQUENCY LOCKING SYSTEM USING SOUND INTERMEDIATE FREQUENCY (IF) CARRIER IN A TELEVISION SIGNAL

BACKGROUND OF THE INVENTION

This invention relates generally to frequency locking systems for television signal reception and demodulation, and more particularly the invention relates to circuitry which is immune to ghost signals which interrupt a transmitted television signal.

Echo signals or ghost signals have been one of the major problems in modern television transmission. When a transmitted signal is received from the air, ghosts can be caused by reflections from mountains, buildings, and the like. In a television signal received through cable, the ghost can be due to discontinuities of the connectors. Although the ghosts are generated in a radio frequency spectrum, the process in which the ghost is created can be accurately modeled as a linear distortion in a baseband signal. Therefore, cancelling the ghost can be accomplished by passing the baseband signal through a linear filter which is an inverse of the linear model of the ghosting process.

In a television equipped with a ghost cancellation system, one needs to run a digital or analog filter with a system clock whose frequency is locked to the video signal. Some ghosts can cause conventional line locked or burst locked systems to fail to acquire steady and clean lock. Usually, the sync separator can be confused by some ghosts, making the horizontal sync or burst gate unusable.

In conventional frequency lock system clock generators, the reference used is either a line locked (usually horizontal sync from a sync separator) or a color burst locked using the color burst and a burst gate signal derived from the sync separator. However, as noted above severe ghosts can cause the sync separator to fail thus producing jittery or missing reference horizontal sync or badly or missing burst gate timing. Further, the color burst may have colored ghosts from a previous line which cause contamination.

SUMMARY OF THE INVENTION

In accordance with the invention, a frequency locking system for a television receiver is provided which uses the sound intermediate frequency (IF) carrier as a frequency reference. The detected IF carrier is passed through frequency dividers and phase detector circuits to control a voltage controlled clock oscillator (VCO). The phase detector will have the error voltage as an output to control via a loop filter the voltage control oscillator. The audio program can also appear as an additional error voltage, and a subtractor circuit is used to cancel this using the audio waveform obtained from the sound detector which drives the speaker amplifier.

In a preferred embodiment, the sound carrier is chosen to be exactly 286 times the horizontal clock, and the color subcarrier is 227.5 times the horizontal clock as specified by Federal Communications Commission (FCC) regulations. The derived system clock is then a simple multiple of the color subcarrier, typically 4 times color subcarrier (4×SC).

The invention and objects and features thereof will be more readily apparent from the following detailed description and appended claims when taken with the drawings.

DETAILED DESCRIPTION OF SPECIFIC EMBODIMENTS

Figure 1:
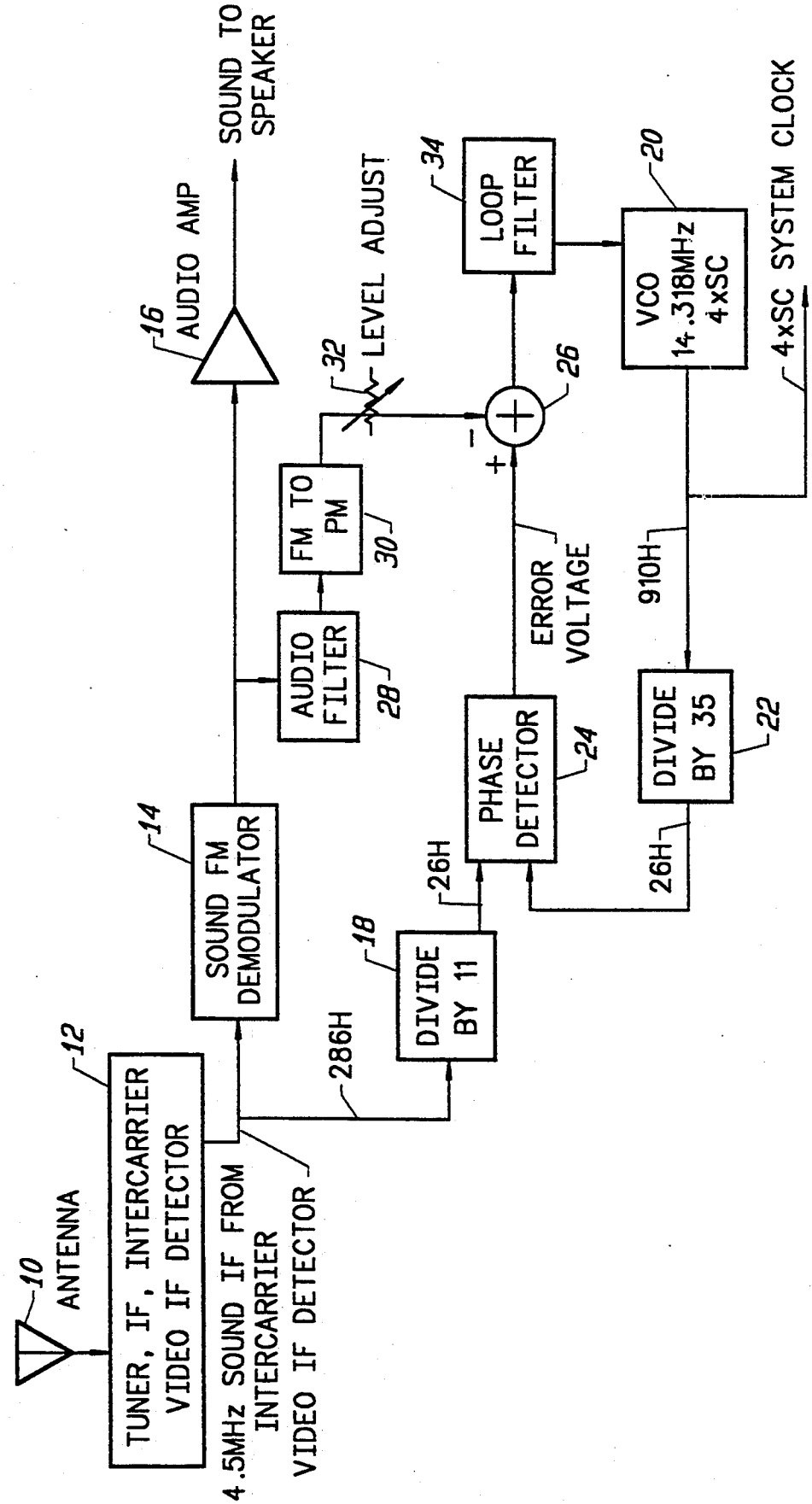
FIG. 1 is a functional block diagram of a sound IF carrier to system clock circuit in accordance with the invention.

Referring now to the drawings, FIG. 1 is a functional block diagram of a frequency locking system using the sound IF carrier in a television signal in accordance with a preferred embodiment of the invention. In this embodiment a broadcast television signal is received by antenna 10 and passed through an IF detector 12 from which a 4.5 MHz sound IF signal and a baseband video signal are obtained. The 4.5 MHz sound carrier is set by the broadcaster to be exactly 286 times the horizontal frequency. This relationship is chosen so that any beats with the chroma subcarrier will result in 58½ cycles per line, the ½ cycle causing peaks on one line to be adjacent to valleys on the next line.

The sound IF signal is applied to a conventional frequency modulation (FM) demodulator 14 to recover the sound signal which is then applied through an audio amplifier 16 to drive an audio speaker. The sound IF is applied also to a divider circuit 18 which divides the sound IF (286 times horizontal frequency) by 11 to produce a 26 times horizontal sync signal (26H).

A voltage controlled oscillator 20 generates a 14.318 MHz (4×SC) clock signal which provides the output system clock and also feeds a divider circuit 22 which divides the clock by 35 to produce a 26 times horizontal sync signal (26H) which is applied along with the 26H signal from divider 18 to phase detector 24. The output of phase detector 24 is an error signal from divider 22, when compared with the reference signal from divider 18, and the error signal is then applied to a subtractor circuit 26. Since part of the error signal is the frequency modulation signal, the audio from the sound detector 14 is processed through a bandpass filter 28 to eliminate direct current (DC) and through an FM to phase modulation (PM) converter 30 and level adjustment 32 as a second input to the subtractor 26. The adjustment 32 is used to fine tune the null. A loop filter 34 filters out any residual audio and also filters the error voltage induced by errors of frequency from the VCO 20 and is then reapplied to control the VCO 20. The resulting phase locked loop control of the VCO 20 provides the 4×SC system clock output.

Figure 2:
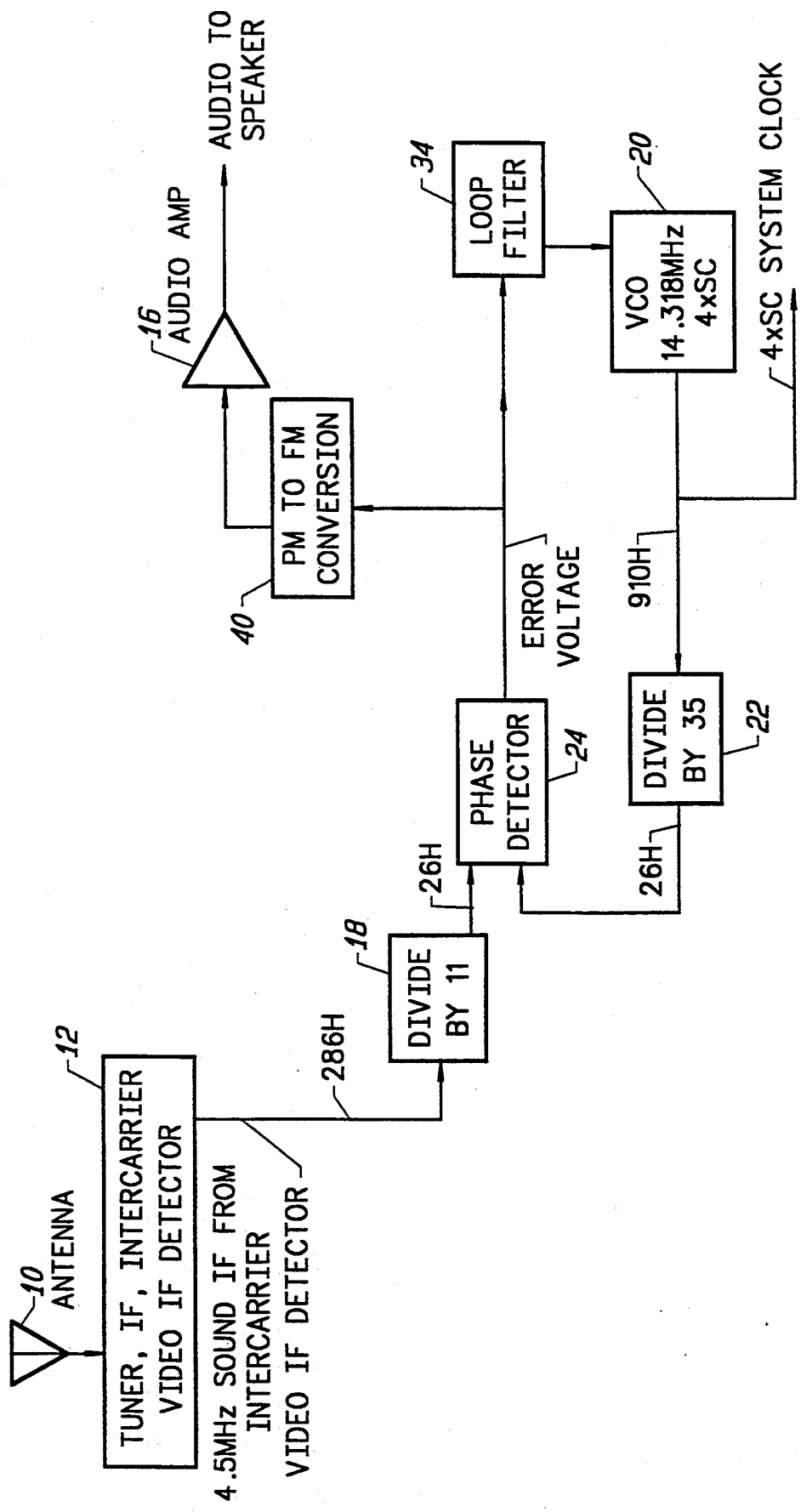
FIG. 2 is a functional block diagram of an alternative simplified system clock circuit in accordance with the invention.

FIG. 2 is a functional block diagram of an alternative embodiment which is simpler than the embodiment of FIG. 1 in which the sound FM demodulator 14 is omitted and the error voltage induced by the audio FM modulation is converted from PM to FM at 40 to drive the audio amp 16 and speaker. Like elements in the circuits of FIGS. 1 and 2 have the same reference numerals. This circuit puts more demand on the loop filter to filter out the audio waveform in the error voltage and risk the application of audio frequency errors from the VCO being heard by the audio amplifier and speaker. However, the embodiment provides a cost reduction by eliminating the sound FM demodulator 14, audio 28 FM to PM converter 30 and level adjust 32 at FIG. 1.

The described frequency locking system using the sound IF carrier provides increased immunity to ghost signals in the transmitted television signal. The sound carrier will usually always be present since the television viewer will adjust the antenna to maximize sound reception. Other system clock frequencies are possible by using different divide ratios in the divider circuits. In the described embodiments the number of sound carrier cycles per line, 286, and the number of 4×SC cycles per line, 910, are factored to find common factors.

While the invention has been described with reference to specific embodiments, the description is illustrative of the invention and is not to be construed as limiting the invention. Various modifications and applications may occur to those skilled in the art without departing from the true spirit and scope of the invention as defined by the appended claims.

What is claimed is:

1. A frequency controlled clock circuit for use in a television receiver comprising:
   means for receiving a television signal,
   intermediate frequency (IF) detector means for detecting a sound IF signal in said television signal,
   a voltage controlled oscillator for generating a clock signal, and
   phase locked loop circuitry responsive to an error signal derived from said clock signal and from said sound IF signal and providing a control voltage to said voltage controlled oscillator in a phase locked loop, said phase locked loop circuitry including:
   a first divider for dividing down a frequency of said sound IF signal to form a reference signal,
   a second divider for dividing down a frequency of said clock signal, and
   phase detector means for generating a phase error signal between said reference signal and said divided clock signal.

2. The frequency controlled clock circuit as defined by claim 1 and further including a loop filter for receiving and filtering said control voltage and producing a filtered control voltage, and
   means for applying said filtered control voltage to said voltage controlled oscillator.

3. The frequency controlled clock signal as defined by claim 2 and further including a phase modulation to frequency modulation (PM to FM) converter for receiving said phase error signal and generating an audio signal for driving a speaker.

4. The frequency controlled clock signal as defined by claim 3 and further including an audio amplifier for amplifying said audio signal.

5. The frequency controlled clock circuit as defined by claim 1 and further including a sound frequency modulator (FM) demodulator for receiving said IF signal and generating an audio signal,
   subtractor means for subtracting said audio signal from said error signal and producing an output voltage,
   a loop filter for receiving and filtering said output voltage and producing a filtered output voltage, and
   means for applying said filtered output voltage to said voltage controlled oscillator.

* * * * *